United States Patent [19]

Stute et al.

[11] Patent Number: 5,324,532
[45] Date of Patent: Jun. 28, 1994

[54] STARCH MIXTURES AS PUDDING STARCHES

[75] Inventors: Rolf Stute, Flein; Heinz Kern, Leingarten-Grobgartach, both of Fed. Rep. of Germany

[73] Assignee: CPC International Inc., Englewood Cliffs, N.J.

[21] Appl. No.: 148,165

[22] Filed: Nov. 4, 1993

Related U.S. Application Data

[63] Continuation of Ser. No. 770,698, Oct. 3, 1991, abandoned.

[30] Foreign Application Priority Data

Oct. 3, 1990 [DE] Fed. Rep. of Germany ....... 4031162

[51] Int. Cl.$^5$ ............................................. A23L 1/0522
[52] U.S. Cl. ........................................ 426/578; 426/579
[58] Field of Search ................................. 426/578, 579

[56] References Cited

U.S. PATENT DOCUMENTS

| 3,630,773 | 12/1971 | Schoch | 127/71 |
|---|---|---|---|
| 4,235,939 | 11/1980 | Kimberly, Sr. | 426/549 |
| 4,490,397 | 12/1984 | Maurice et al. | 426/276 |
| 4,499,113 | 2/1985 | Mochizuki et al. | 426/291 |
| 4,590,084 | 5/1986 | Miller et al. | 426/557 |
| 4,695,475 | 9/1987 | Zwiercan et al. | 426/661 |
| 4,810,517 | 3/1989 | Glittenberg et al. | 426/578 |
| 4,874,628 | 10/1989 | Eden et al. | 426/578 |
| 4,948,615 | 8/1990 | Zallie et al. | 428/578 |

FOREIGN PATENT DOCUMENTS 0240313 10/1987 European Pat. Off. .

OTHER PUBLICATIONS

Rombauec, I., The Joy of Cooking, pp. 738, 739, 134, 1975.
Szigeti et al., Elelmezesi 1par (1987)41 (4) 132-137, FSTA Abstract.
Stute. R, Starke (1990) 42 (6) 202-212 FSTA Abstract.

Primary Examiner—Jeanette Hunter

[57] ABSTRACT

The invention relates to the use of a mixture of pea starch and corn starch in a ratio of 9:1 to 1:9 as a gelling and texturing agent for foodstuffs as well as for foodstuffs subjected to heating, consisting of a mixture of pea starch, preferably smooth pea starch, and corn starch in a ratio of 9:1 to 1:9, preferably 9:1 to 3:7 and in particular 8:2 to 4:6.

5 Claims, No Drawings

STARCH MIXTURES AS PUDDING STARCHES

This application is a file wrapper continuation of pending application Ser. No. 07/770,698 filed on Oct. 3, 1991, now abandoned.

The invention relates to starch mixtures like binding gelating agents respectively for foodstuffs subjected to heating, e.g. sauces and cooked puddings, in particular cooked puddings having a flan-like structure. Flans are fine, delicately melting pudding-like desserts or sweets which are made by heating or steaming in a water bath and characterized by a good demoldability, a smooth surface as well as a good form stability (no change in shape and height). Typical gelling agents used for flans are agar agar, carrageenan and starch.

It is known that a number of legume starches, in particular pea and lentil starch, in comparison to corn starch which is preferred for making puddings, display an increased gelation capacity and are, therefore, suitable for use as pudding starch. Due to the higher retrogradation tendency of smooth pea starch or lentil starch, demoldable puddings can be prepared with an amount of starch reduced by almost 50% in comparison to corn starch (R. Stute: Stärke (=starch) 42 (1990) 207-212).

Pregelatinized legume starches, for instance from peas, were already proposed for making demoldable instant desserts (EP-A1-240 313).

However, during application, non-pregelatinized pea starch shows two disadvantages: the first disadvantage is the delayed gelatinization in comparison to corn or potato starch. In practical use this means a longer cooking time. In the case of a short cooking time (as usual with corn starch), the gelatinization of the starch granules is not yet complete, and the gels obtained do not have the required smooth texture, but often have a grainy, brittle mouth feel. A preparation that is less problematic with regard to the preparation conditions, i.e. a preparation requiring shorter cooking times, is, therefore, desirable.

The second disadvantage of pea starch gels is the stronger syneresis, which means an increased water separation, particularly at refrigerator temperatures. This water separation and the gelation behavior are the result of the higher amylose content of pea starch. In the same way that the association of the amylose chains leads to the formation of a gel which is moldable and cutable, conditions which promote the further association of the amylose chains (i.e. longer storage times and/or refrigeration temperatures) lead to increased water separation.

Thus, there is a need for improving the syneresis stability of gels based on pea starch, such as of cooked puddings, while the lower starch concentration as compared to corn starch as well as the smooth, flan-like texture should be maintained.

In contrast to the above-described disadvantages, it is, however, well known that pea starch gels are less sticky than corn starch gels and have a characteristic flan-like texture. Due to this advantageous property, the use of pea starch seems desirable for making desserts and puddings.

Surprisingly it has been found that these advantageous properties of pea starch are maintained, while the disadvantageous properties thereof are simultaneously eliminated when pea starch is used in a mixture with corn starch.

Thus, in its most general form, the present invention comprises the use of a mixture of pea starch and corn starch in a ratio of about 9:1 to about 1:9 as binding and gelling agent for foodstuffs, in particular for making cooked puddings. The term cooked pudding also covers such puddings of flan-like structure, for which the invention is particularly well-suited.

Subject matter of the invention, thus, are also the mixtures to be used according to the invention, in the form of texture-giving substances for foodstuffs subjected to heating, consisting of a mixture pea starch, preferably smooth pea starch, and corn starch in a ratio of about 9:1 to about 1:9, preferably about 9:1 to about 3:7 and in particular about 8:2 to about 4:6.

The gels produced with the starch mixtures according to the invention have the advantages of pea starch gels, namely the typical flan-like texture, but can be prepared in a simpler manner. They can be prepared like gels from pure pea starch with a lower amount of starch, they display a good mouth feel and have an improved syneresis stability. Depending on the liquid used (the structure of the finished gel, is also dependent on the liquid which is used, e.g. whole milk, homogenized milk, skim milk, etc.) the effect achieved is not only that the smooth flan-like structure is maintained completely or to a large extent with additions of corn starch of up to 70%, but it is also surprising that no increase in the starch concentration is necessary, and therefore, with the same low starch concentration of 50 g/l demoldable gels are obtained.

It was particularly surprising that, without an increase in the starch concentration, the flan-like character and the demoldability are maintained in virtually unrestricted manner down to a content of only 40% pea starch. It is just as surprising that relatively small amounts of corn starch are sufficient for improving the stirring-in behavior of the mix. In addition to the two surprising (non-linear) property changes, another advantage is that the water separation improves continuously, The use of the mixtures of pea and corn starch according the invention, therefore, provides a number of advantages:

1. A lower concentration of starch means less calories from starch.
2. The preparation of the puddings, sauces, etc. can take place in the same manner, i.e. as with corn starch (i.e. the housewife or chef can proceed in the same way as before).
3. The lower starch concentration means a general advantage in terms of costs. On the one hand, the addition of the usually less expensive corn starch means a cost reduction. On the other hand also the addition of pea starch to corn starch leads to a cost reduction due to the lower starch requirement, in mixtures in which the corn starch gel properties dominate.
4. The gel structure (texture, mouth feel etc.) can be altered by proper selection of the mixing ratio and, in particular, can be adjusted to the liquid used. Flan-like texture, demoldability and stability in shape are nevertheless maintained.
5. During the mixing of the two starches it is possible to integrate further recipe ingredients, such as coloring and flavoring ingredients, and any additional ingredients having an influence on the texture and water binding capacity (e.g. carragheens, alginats, waxy rice starches).

6. The starch mixtures according to the invention can be used in the same manner as corn starch for making sauces (e.g. vanilla sauce) in addition to making cooked puddings. The advantages are good stirring-in properties and short cooking times.

In addition to corn starch according to the invention other starches can also be used to modify the gel properties. Potato and tapioca starch may be used advantageously for modifying the gel properties towards softer, more creamy gels which also show absolutely no stickiness (example 5).

On the other hand, it is not possible to simply replace the corn starch by potato or tapioca starch (cf. comparative example 4).

EXAMPLE 1

Cooked puddings (type vanilla) were prepared from mixtures of pea and corn starch in the usual manner (mixing of the starch in 50 ml milk, addition of the suspension to the remaining milk which has been brought to the boil, and short boiling for approx. 30 sec.), using 40 g sugar and in total 500 ml milk (fat content 3.5%). The amount of starch was always 25 g.

Table 1 describes the sensory properties, demoldability and the stability in shape and height of the puddings obtained.

In this respect, the terms demoldability and stability in shape and height mean that the gels obtained after cooling and after demolding show a smooth surface without cracks and the shape is being maintained both in width and in height (no sinking in and no expansion in width).

The fact that the flan-like character of the pudding surprisingly is maintained down to a ratio of only 40% pea starch is also evidenced by penetrometer curves in addition to the sensory evaluation. While in case of corn starch, or for puddings containing up to 70% corn starch, the force measured up to the maximum. penetration depth (15 mm) increases continuously, the gels in the other puddings break apart—this being also the reason why they are called flan-like, and the measured value drops.

broad concentration range (from 80% to 40% pea starch).

EXAMPLE 2

Analogously to example 1, cooked puddings (type vanilla) were prepared using low-fat homogenized milk (fat content 1.5%). However, as a difference from example 1, the cooking time was varied, and the liquid separation was determined after two days in the refrigerator.

Table 2 describes the puddings obtained in comparison to pure pea starch.

TABLE 2

| Mixing ratio peas:corn | | concentrations (g/500 ml) | Liquid separation (ml) of different cooking times | | | Sensory Judgment after different cooking times | | |
|---|---|---|---|---|---|---|---|---|
| | | | 15' | 30' | 60' | 15' | 30' | 60' |
| 100 | 0 | 25 | 15 | 10 | 9 | smooth flan-like texture, but rough sensation in mouth, constantly decreasing with increasing cooking time | | |
| 80 | 20 | 25 | 8 | 8 | 7 | smooth flan-like texture | | |
| 50 | 50 | 25 | — | 4.5 | 2 | smooth flan-like texture | | |

This example illustrates the strong influence of the cooking time on the liquid separation as well as on the sensory properties. Puddings consisting of starch mixtures thus can be prepared more easily than those of pure pea starch, with the surprising effect that already the relatively low addition of 20% corn starch clearly increases the syneresis stability without significant changes in the sensorical properties.

EXAMPLE 3

In analogous manner to example 1, chocolate puddings with 7 g cocoa were prepared.

Table 3 indicates the water separation and the sensory properties of the puddings obtained:

| Mixing ratio peas:corn | | Demoldability | Surface | Stability in shape or height | Sensory Judgment | Water separation* ml H$_2$O |
|---|---|---|---|---|---|---|
| 100 | — | very good | smooth | shape & height unchanged | flan-like | 9.6 |
| 80 | 20 | very good | smooth | shape & height unchanged | " | 7.2 |
| 60 | 40 | good | virtually smooth | shape & height unchanged | " | 6.2 |
| 50 | 50 | " | virtually smooth | first perceptible change in shape | " | 2.5 |
| 40 | 60 | " | virtually smooth | perceptible change in shape | " | 1.5 |
| 30 | 70 | satisfactory | first cracks | clear changes in shape and height | still flan-like | — |
| — | 100 | flows apart | mushy | — | sticky | 0 |
| Comparison: corn starch 35 g instead of 25 g | | very good | smooth | shape & height unchanged | sticky | 0 |

*after 2 days in the refrigerator

A striking fact in the penetrometer curves is that in addition to the agreement with the sensory evaluation, gels of very similar consistency are obtained over a

TABLE 3

| Mixing ratio peas:corn | | concentration (g/500 ml) | Liquid* separation (ml) | Sensory Judgment |
| --- | --- | --- | --- | --- |
| 100 | 0 | 27 | 37 | flan-like |
| 90 | 10 | 27 | 39 | flan-like |
| 0 | 100 | 37 | 0 | typical corn starch |

*after 3 days in refrigerator

This example shows that corresponding results are achieved for chocolate puddings as well.

COMPARATIVE EXAMPLE 4

Cooked puddings were prepared analogously to example 1, with the addition of 20 and 30% tapioca and potato starch instead of corn starch.

Table 4 and the corresponding penetrometer curves show that the typical flan-like texture, when the foregoing starches are used, is destroyed already with these relatively small additions, especially in case of the tapioca starch where the form stability is significantly decreased (lower height of the demolded pudding).

EXAMPLE 5

Cooked puddings were made analogously to example 1, however, only part of the corn starch was replaced by potato starch. As evidenced by table 5, demoldability, surface and stability in shape and height remain good, however, the flan-like gel character is changed towards a more creamy texture. The mouth feeling is pleasant and in no way sticky. The gel is still compact and cutable, and breaks when subjected to mechanical forces (as in the mouth) and, furthermore, is not sticky. Thus via the addition of potato starch a light and creamy, still demoldable gel can be obtained.

TABLE 4

| Mixing ratio | | | Demoldability | Surface | Stability in shape or standing | Sensory Judgment |
| --- | --- | --- | --- | --- | --- | --- |
| peas | potato | tapioca | | | | |
| 80 | 20 | — | very good | smooth | shape & height unchanged | sticky |
| 70 | 30 | — | very good | smooth | shape & height unchanged | sticky |
| 80 | — | 20 | good | rough | flatter | sticky |
| 70 | — | 30 | good | rough | clearly flatter | sticky |

TABLE 5

| Mixing ratio | | | Demoldability | Surface | Stability in shape or height | Sensory Judgment | Water separation |
| --- | --- | --- | --- | --- | --- | --- | --- |
| Pea | Corn | Potato | | | | | |
| 70 | 30 | — | good | smooth | hardly changed | creamy light, not sticky | 1.8 |
| 70 | 25 | 5 | good | smooth | slightly changed | creamy light, not sticky | — |

We claim:

1. The process for the production of a gelling and texturizing agent for use in smooth, textured foodstuffs which are subjected to heat and which exhibit improved syneresis stability, comprising mixing smooth pea starch and corn starch in a ratio of from about 9:1 to about 1:9.

2. The process of claim 1 wherein the pea starch and the corn starch are present in a ratio of about 9:1 to about 3:7.

3. The process of claim 1 wherein the pea starch and the corn starch are present in a ratio of about 8:2 to about 4:6.

4. A gelling and texturizing agent for use in smooth textured foodstuffs which are subjected to heat and which exhibit improved syneresis stability consisting of a mixture of smooth pea starch and corn starch in a ratio of from about 9:1 to about 1:9.

5. A cooked pudding with the smooth texture of flan comprising the gelling and texturizing agent of claim 4.

* * * * *